United States Patent
Hsu et al.

(10) Patent No.: US 6,169,898 B1
(45) Date of Patent: Jan. 2, 2001

(54) APPARATUS, AND ASSOCIATED METHOD, FOR MAINTAINING A SELECTED QUALITY OF SERVICE LEVEL IN A RADIO COMMUNICATION SYSTEM

(75) Inventors: Liangchi Hsu, Arlington; Rene W. Purnadi, Watauga, both of TX (US)

(73) Assignee: Nokia Mobile Phones Ltd, Espo (FI)

(*) Notice: Under 35 U.S.C. 154(b), the term of this patent shall be extended for 0 days.

(21) Appl. No.: 09/116,351

(22) Filed: Jul. 16, 1998

(51) Int. Cl.$^7$ ................................................. H04Q 7/20
(52) U.S. Cl. .................. 455/432; 455/433; 455/450; 455/436; 455/452
(58) Field of Search ........................... 455/422, 432, 455/433, 436, 450, 452, 456; 370/322, 329, 328, 330, 348, 335, 443, 444

(56) References Cited

U.S. PATENT DOCUMENTS

| | | | |
|---|---|---|---|
| 5,412,375 | 5/1995 | Wood | 340/825.03 |
| 5,497,504 | 3/1996 | Acampora et al. | 455/33.2 |
| 5,983,099 * | 11/1999 | Yao et al. | 455/426 |
| 5,999,522 * | 12/1999 | Rohani | 370/331 |
| 6,002,936 * | 12/1999 | Roel-Ng et al. | 455/456 |
| 6,021,122 * | 2/2000 | Tiedemann, Jr. | 370/331 |
| 6,038,448 * | 3/2000 | Chheda et al. | 455/436 |
| 6,058,309 * | 5/2000 | Huang et al. | 455/433 |

FOREIGN PATENT DOCUMENTS 0 848 560 A2    6/1998  (EP).

* cited by examiner

*Primary Examiner*—William G. Trost
*Assistant Examiner*—Temica M. Davis
(74) *Attorney, Agent, or Firm*—Robert H. Kelly; Brian T. Rivers

(57) ABSTRACT

Apparatus, and an associated method, for maintaining a selected QoS (quality of service) level of communications by a mobile station as the mobile station travels throughout an area encompassed by a radio communication system. Subscriber QoS classes are defined. One of the QoS classes is selected pursuant to a service subscription permitting the mobile station to communicate in the radio communication system. The selected QoS class is stored at a service subscription register. During communications with the mobile station, resources are reserved for use by the mobile station at a level corresponding to the selected QoS class.

22 Claims, 6 Drawing Sheets

102

STORE AN INDICATION OF A SELECTED QoS LEVEL OF WHICH COMMUNICATIONS WITH A MOBILE STATION ARE TO BE MAINTAINED — 104

SELECTIVELY RESERVE RESOURCES AT SELECTED ONES OF THE FIXED-SITE TRANSCEIVERS — 106

32

| IMEI | SUBSCRIPTION DATA |
|---|---|
| IMEI OF MOBILE STATION NO. 1 | SQC OF MOBILE STATION NO. 1 |
| IMEI OF MOBILE STATION NO. 2 | SQC OF MOBILE STATION NO. 2 |
| ⋮ | ⋮ |
| IMEI OF MOBILE STATION NO. N | SQC OF MOBILE STATION NO. N |

38 ~ (left column), 42 (right column)

```
┌─────────────────────────────────┐
│   STORE AN INDICATION OF A      │
│      SELECTED QoS LEVEL         │─104
│  OF WHICH COMMUNICATIONS WITH A │
│ MOBILE STATION ARE TO BE MAINTAINED │
└─────────────────────────────────┘
              │
┌─────────────────────────────────┐
│     SELECTIVELY RESERVE         │
│   RESOURCES AT SELECTED         │─106
│    ONES OF THE FIXED-SITE       │
│       TRANSCEIVERS              │
└─────────────────────────────────┘
```

*FIG. 9*

APPARATUS, AND ASSOCIATED METHOD, FOR MAINTAINING A SELECTED QUALITY OF SERVICE LEVEL IN A RADIO COMMUNICATION SYSTEM

The present invention relates generally to QoS (Quality of Service) levels of communications in a radio communications system, such as a cellular communication system. More particularly, the present invention relates to apparatus, and an associated method, for maintaining a selected QoS level of communications by a mobile station as the mobile station travels throughout an area encompassed by the radio communication system.

Subscriber QoS classes are defined. Different classes of QoS levels assure different levels of QoS as the mobile station moves. When a subscription for service by a user of the mobile station is purchased, the subscription rate is, e.g., dependent in part upon the QoS class to which the subscription is made. The amount of resources reserved by the system for communications with the mobile station is dependent upon the QoS class of the service subscription. The amount of resources reserved can also be selected at the start of a communication session.

In an exemplary implementation in a cellular communication system, resources, e.g., channels, are selectively reserved for the mobile station, not only in a cell in which communications are ongoing, but also in selected cells proximate thereto. The number of additional cells in which resources are reserved and the duration that the resources are reserved is dependent upon the QoS class. A greater level of mobility independence is thereby available for communications.

BACKGROUND OF THE INVENTION

The use of wireless communication systems by which to communicate voice and data information has achieved wide popularity in recent years. As a wire line connecting a sending station and a receiving station is not required to effectuate communication, communication by way of a wireless communication system is possible at a location to which formation of a wire line connection would be impractical or impossible.

A cellular communication system is exemplary of a radio communication system which has achieved wide popularity in recent years. Cellular communication networks of various types of cellular communication systems have been installed throughout significant portions of the world. Subscribers to cellular communications systems are able to communicate telephonically when positioned in areas encompassed by the networks of such systems. Telephonic communication of both voice information and data information are permitted with such networks.

A subscriber to a cellular communication network is permitted access to the network to communicate therewith pursuant to a service subscription. The service subscription provides, e.g., an identification number which is used to identify uniquely the subscriber, both to permit utilization of the network and also to bill a subscriber for such utilization. Communications originated at, and sometimes terminated at, a mobile station operable pursuant to the service subscription are billed to the subscription account associated with the service subscription.

Conventional cellular communication systems are typically mobility dependent. That is to say, during communication set-up, communications with the mobile station are permitted if communication quality levels, i.e., the QoS, of communications between the base station in which the mobile station is positioned and the mobile station is of an acceptable level. However, if the mobile station travels out of the initial cell, and into another cell, the QoS of continued communications is not assured. For instance, if channels are not available for communications with the mobile station in the subsequent cell, a hand-off of communications is not permitted. Deterioration of communication quality is possible, passively resulting in unintended termination of communications. Communication conditions might also change while the mobile station is positioned in the initial cell. Therefore, in a conventional, cellular communication system in which QoS is mobility dependent, there are no assurances that a required QoS level can be maintained in an ongoing communication when the mobile station passes from one cell to another or when communication conditions otherwise change.

A communication system which, conversely, is mobility independent, would be better to assure maintenance of the required QoS level as a mobile station moves from one cell to another or when communication conditions otherwise change.

A manner by which to provide a radio communication system, such as a cellular communication system, with mobility-independent QoS would therefore be advantageous.

It is in light of this background information related to radio communication systems, and QoS levels therein, that the significant improvements of the present invention have evolved.

SUMMARY OF THE INVENTION

The present invention, accordingly, advantageously provides apparatus, and a corresponding method, for maintaining a selected QoS level of communications with the mobile station in a radio communication system. By maintaining the selected QoS level, a selected level of mobility-independent QoS is better assured.

In one aspect of the present invention, subscriber QoS classes are defined. Different classes of QoS levels correspond to different levels of mobility-independent QoS of ongoing communications with a mobile station as the mobile station travels throughout a geographical area encompassed by the radio communication system. A user of the mobile station purchases a subscription for service to permit communications through a mobile station with network infrastructure of the radio communication system. The subscription rate of the service subscription is dependent, in part, upon the class of QoS to which the subscription is made. The amount of resources reserved by the system for use to communicate with the mobile station is dependent upon the QoS class of the service subscription. The amount of resources reserved can also be selected at the start of a communication session. Such selection overrides the stored values of the QoS class.

In another aspect of the present invention, mobility-independent QoS is provided to cellular communications in a cellular communication system. When a service subscription is purchased, the subscriber of the subscription is permitted to communicate with the cellular network through a mobile station. When the service subscription is purchased, a selection is made of a subscriber QoS class (SQC). The SQC corresponds to a QoS level that is to be maintained during communications with a mobile station through which communications are to be effectuated pursuant to the service subscription. Resources are reserved for communication with the mobile station, not only in the cell in which the mobile station is presently located, but also at one or more additional cell to which the mobile station might travel during a communication session. The amount of resources reserved by the system is dependent upon the SQC class to which the subscriber subscribes. At higher SQC classes, greater levels of resources are reserved.

In one implementation, SQCs are defined in a cellular communication system constructed to correspond to the standards of the IS-95 3G system. In such system, the cells defined by the base stations of the network infrastructure of the system are defined, relative to a mobile station, to be of one of four different sets of cells. Namely, the cells are defined to be members of an active set, a candidate set, a neighbor set, or a remaining set. The cells sets are dynamically redefined, with respect to the mobile station, as the mobile station moves through the geographical area encompassed by the communication system. The SQCs are defined relative to the sets defined in the IS-95 3G system. In one implementation, a first class SQC allocates resources only in the active set of cells. Higher-levels of SQCs further reserve resources in at least selected ones of the candidate set of cells. And, in still higher levels of SQCs, additional resources are reserved in at least selected ones of the neighbor set of cells. Further differentiation between the various classes of cells is provided by the start times at which the resources are reserved in the various cell sets, and the duration periods during which such resources are reserved.

In other implementations, for instance, in cellular communication systems constructed according to analog or TDMA (time division multiple access) standards, analogous SQCs are defined. In a TDMA system, as well as an analog system, cells are classified in manners analogous to the classifications of the cells to be members of active, candidate, and neighbor sets designated in the IS-95 3G standard. An SQC is selected by a subscriber pursuant to the subscriber's purchase of a service subscription. Subsequent to call origination, or termination, at the mobile station operable pursuant to the service subscription, resources are reserved by the cellular system responsive to the selected SQC.

In these and other aspects, therefore, apparatus, and an associated method, is provided for maintaining a selected QoS (quality of service) of communications of a mobile station. The mobile station is operable in a multi-user, radio communication system having a fixed network including a plurality of spaced-apart, fixed-site transceivers positioned throughout a geographic area. Each fixed-site transceiver defines a coverage area in which communications with a mobile station are permitted pursuant to a service subscription. The selected QoS is maintained as the mobile station travels throughout the geographic area encompassed by the radio communication system. A service subscription register is associated with the mobile station. The service subscription register stores an indication of a selected QoS level of which communications with the mobile station are to be maintained. The indication of the selected QoS level is indexed together with an identifier which identifies the mobile station. A resource reserver is coupled to receive information representative of the indication of the selected QoS level stored at the service subscription register. The resource reserver is also coupled to the plurality of spaced-apart, fixed-site transceivers. The resource reserver selectively reserves resources at selected ones of the fixed-site transceivers for communications by the mobile station. The resources are caused to be selectively reserved, and the time periods during which the resources are caused to be selectively reserved, are responsive to the QoS level associated with the mobile station. The resources reserved by the resource reserver assures that the selected QoS level of the communications by the mobile station is available to the mobile station.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 illustrates information stored at the service subscription register shown in FIG. 1, and forming a portion of an embodiment of the present invention.

FIG. 9 illustrates a method flow diagram listing the method steps of the method of an embodiment of the present invention.

DETAILED DESCRIPTION

Figure 1:
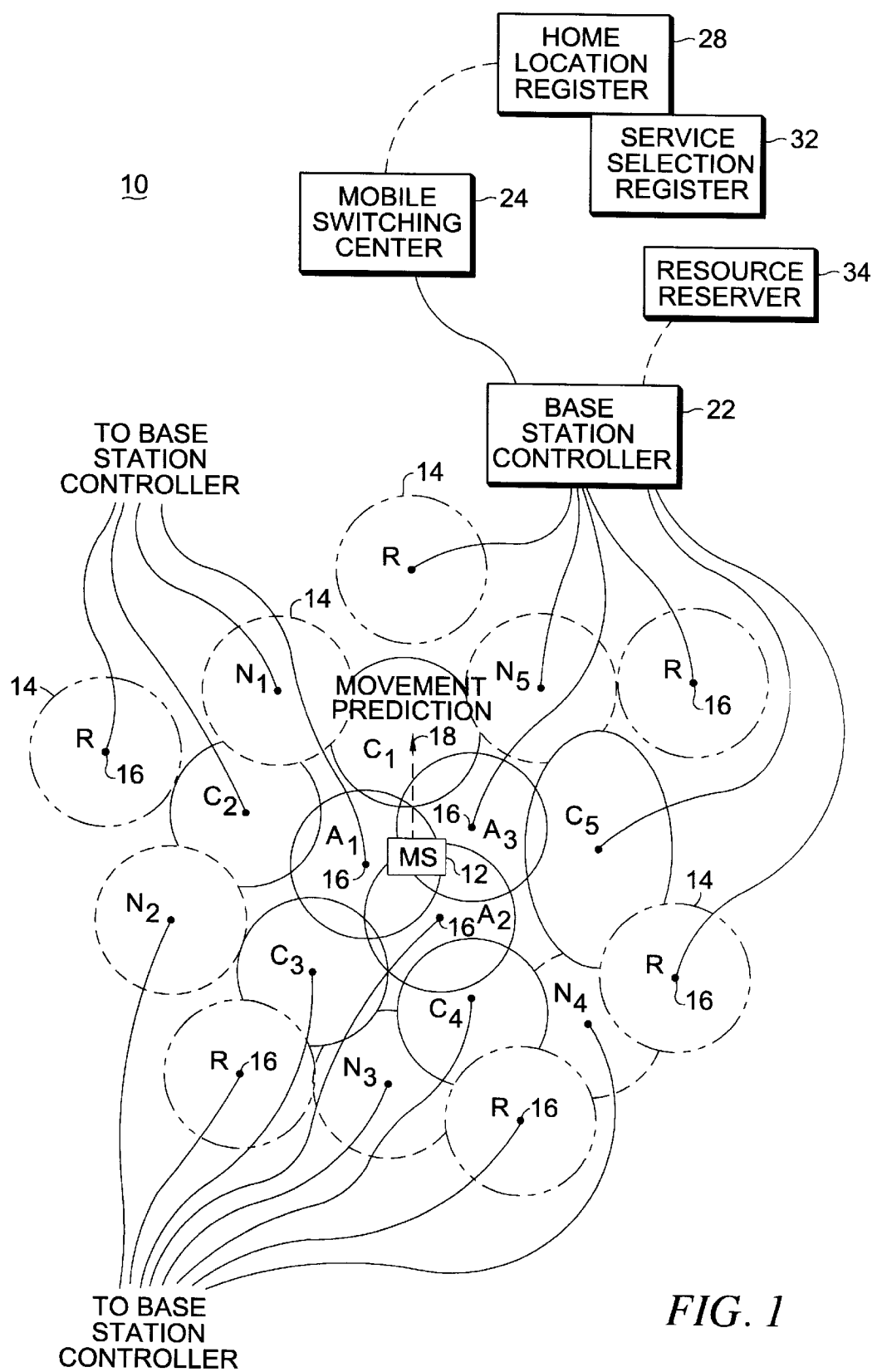
FIG. 1 illustrates cells defined in an exemplary cellular communication system together with a functional block diagram of a portion of the network infrastructure of the cellular communication system which includes an embodiment of the present invention as a portion thereof.

Referring first to FIG. 1, a portion of a cellular communication system shown generally at 10, permits telephonic communications with wireless transceivers, of which the mobile station (MS) 12 is representative. The system 10 is here representative of the cellular communication system defined in the IS-95 3G specification standard promulgated by the EIA/TIA. Other cellular communication systems, and other radio communication systems, can be analogously represented.

The portion of the system 10 illustrated in the FIG. includes a plurality of cells 14. Each of the cells 14 is defined by a radio base station 16. The radio base stations 16 form fixed-site transceivers positioned at spaced-apart locations throughout the geographical area encompassed by the communication system 10. For purposes of illustration, the base stations 16 are positioned at the centers of the cells 14 which are defined by the individual ones of the base stations 16. In actual implementations, other arrangements are possible. For instance, through the use of sector antennas, three base stations may be co-located, and cells defined by the base stations may be defined by the sectors of coverage of such sector antennas.

The cells 14 of the system 10 are further designated by the set definitions defined in the IS-95 3G standard. That is to say, the cells 14, relative to the mobile station 12 are dynamically determined to be members of one of four sets of cells, namely an active set, a candidate set, a neighbor set, and a remaining set.

Cells 12 of the active set are designated by the designation A. Here, three cells 12 are members of the active set, cells A1, A2, and A3. Cells 12 defined to be members of the active set are the cells having pilot signals associated with forward traffic channels assigned for communications with the mobile station 12.

Cells 14 of the candidate set are designated by the designation C. Here, five cells 14 are members of the candidate set, cells C1, C2, C3, C4, and C5. Cells 14 defined to be members of the candidate set are the cells having pilot signals that are not currently members of the active set but in which the pilot signals have been received by the mobile station 12 with sufficient strength to indicate that the forward traffic channels associated with such cells could be used for communications.

Cells 14 of the neighbor set are designated by the designation N. Here, five cells N are members of the neighbor set, cells N1, N2, N3, N4 and N5. Cells 14 defined to be members of the neighbor set are the cells having pilot signals of characteristics not to be included in the active set or the candidate set, and are not likely candidates for hand over of communications as the mobile station 12 travels through the communication system 10.

Cells 14 of the remaining set are designated by the designation R. Cells 14 defined to be members of the remaining set are those cells which do not form members of the active, candidate, or neighbor sets.

The members of the cell sets are dynamically redefined as the mobile station 12 travels or the communication conditions of the traffic channels otherwise change. The assignation of cells to various sets shown in the FIG. is exemplary. Generally though, cells of the active set are typically cells positioned most proximate to where the mobile station 12 locates. Generally also, cells of the candidate set are cells, outward of the cells of the active set, but still close to the mobile station 12. Cells of the neighbor set are generally cells adjacent to those of the candidate set, but farther away from the mobile station 12. And, cells of the remaining set are generally those located far away from the mobile station.

In this type of cell classification, and as indicated in the exemplary illustration, the mobile station 12 is here currently active at a location encompassed by the active set of cells and is likely to move, such as in the direction indicated by the arrow 18, into a cell of the candidate set of cells at a time, dependent upon the speed and direction of the mobile station. By utilizing movement prediction techniques, it is possible to predict with some likelihood a subset of the cells of the candidate set are more likely into which the mobile station 12 shall travel.

The base stations 16 are coupled to base station controllers, of which the base station controller (BSC) 22 is exemplary. Typically, several base stations are coupled to, and are controlled by, a single BSC. Each BSC is coupled to a mobile switching center (MSC), of which the MSC 24 is exemplary. Typically, several BSCs are coupled to a single MSC. Each MSC, in turn, is coupled to a PSTN (public-switched telephonic network).

According to an embodiment of the present invention, the BSCs, such as the BSC 22 include a resource reserver 26. And, the MSC 24 is shown further to include an HLR (home location register) 28. A portion of the HLR 28 is formed of a service subscription register 32.

In conventional manner, the mobile station 12 is associated with an HLR, here the HLR 28. The HLR stores data associated with the mobile station. The service subscription register 32, forming a portion of an embodiment of the present invention, is used to store subscription information related to the subscription pursuant to which the mobile station 12 is operable. Here, in particular, the service subscription register 32 stores data related to the SQC (subscriber quality of service) purchased pursuant to the service subscription of the mobile station 12. The level of mobility-independence, i.e., the amount of resources reserved for communications by the mobile station, is dependent upon the level of SQC of the service subscription. During communication set-up, or thereafter, the data stored at the service subscription register 32 is accessed. Responsive to the data accessed at the service subscription register, the resource reserver 26 associated with the BSCs reserve resources for communications by the mobile station. A selected level of QoS (quality of service) is assured for communications with the mobile station 12 to provide thereby a selected level of mobility independence. The data stored at the service subscription register 32 of the HLR 28 can be transferred, in convention fashion, to a VLR (visited location register) such as when the mobile station 12 is in the roaming mode. User selection of a QoS class can also be made for a particular communication session. Such selection overrides the stored values stored at the register 32.

FIG. 2 illustrates, in tabular form, the data stored at the service subscription register 32 pursuant to an embodiment of the present invention. Here, the mobile station 12 is identified by an IMEI (international mobile station equipment identity) 38. Subscription-specific data, here including an indication of the SQC 42 associated with the mobile station, is indexed against the IMEI 38. The SQC associated with the mobile station 12 is provided to the resource reserver 26 and the appropriate resources are reserved for communications by the mobile station to provide the mobile station with a selected level of mobility-independence. The indications of the SQCs 42 form a default SQC. In an exemplary implementation, a subscriber is able to select an alternate SQC at each service initiation.

In an exemplary implementation, six SQCs are defined. The different classes of SQC are determinative of the level of mobility-independence provided to communications by the mobile station 12. While the resources reserved for communications by the mobile station 12 are dependent upon the SQC associated with the mobile station, the resources reserved for such communications are dynamically determined. That is to say, as conditions, or the position of the mobile station changes, the resources reserved for communications with the mobile station are dynamically reallocated.

Figure 3:
FIG. 3 illustrates a graphical representation of the resources reserved in the cellular communication system shown in FIG. 1 for ongoing communications with a mobile station pursuant to a first SQC (subscriber quality of service class).

FIG. 3 illustrates graphically a first SQC defined according to an embodiment of the present invention. The first class is designated as Class 1. In the graphical representation, the time period during which a resource is allocated to the mobile station 12 is scaled along the abscissa axis 46. And, the cells at which resources are reserved are defined along the ordinate axis 48. When the subscription calls for class 1 QoS, resources of only the active set are allocated for the mobile station, as indicated by the bar 50. In this implementation, class 1 forms a default class and provides the least mobility-independence of the various SQCs. Resources are reserved at the cells of the active set starting at a start time, $T_{start\_active}$, indicated at 52, and extending until an ending time $T_{end\_active}$, indicated at 54. The time 54 might be the termination of a communication session. The time 54 might also be the time when a particular cell is no longer an active cell, such as when a handover occurs.

Figure 4:
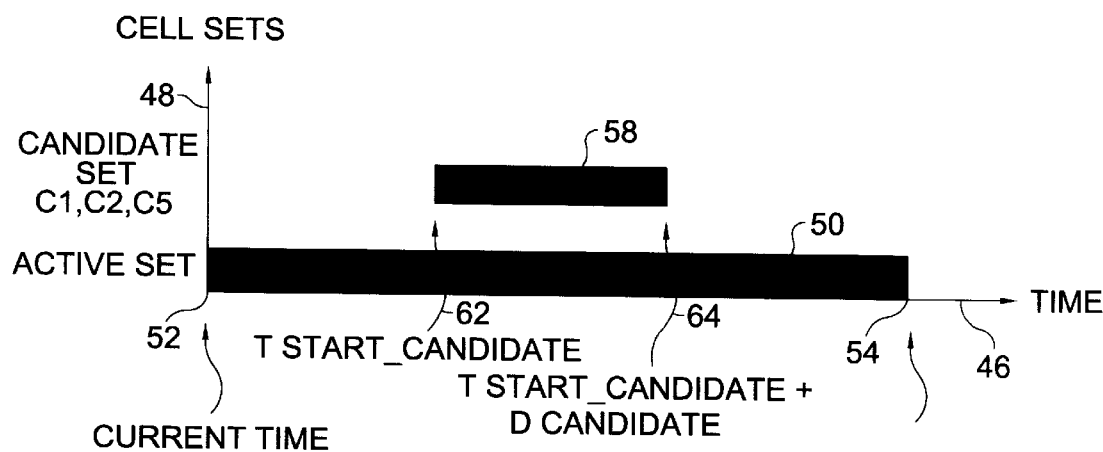
FIG. 4 illustrates a graphical representation, similar to that shown in FIG. 3, but here representative of the resources reserved in the cellular communication system shown in FIG. 1 pursuant to a second SQC.

FIG. 4 represents a second SQC, here designated Class 2. The abscissa and ordinate axes 46 and 48 are the same as those shown in FIG. 3. Here, resources are allocated not only at the cells of the active set, indicated by the bar 50, but also at selected cells of the candidate set, here cells C1, C2 and C5, indicated by the bar 58. In an exemplary implementation, the cells C1, C2 and C5 of the candidate set are selected pursuant to movement predication analysis of the mobile station to reduce the number of cells of the candidate set at which resources are allocated for communications by the mobile station. Again, the bar 50 indicates that the resources are reserved at the cells of the active set starting at the $T_{start\_active}$ time 52 and extending until the $T_{end\_active}$ time 54. For the class 2 QoS, and as indicated by the block 58, resources are allocated at the cells of the candidate set starting at a selected delay relative to the $T_{start\_active}$ time 52, here the time $T_{start\_candidate}$ 62 and extending for a selected duration, here a duration $D_{candidate}$ indicated by the time 64. The time 62 is, in one embodiment, a selected, fixed time delay relative to the $T_{start\_active}$ time 52. In another embodiment, the delay period and also the reservation duration are dynamically determined, responsive to the characteristics of the mobile station, such as its velocity.

Figure 5:
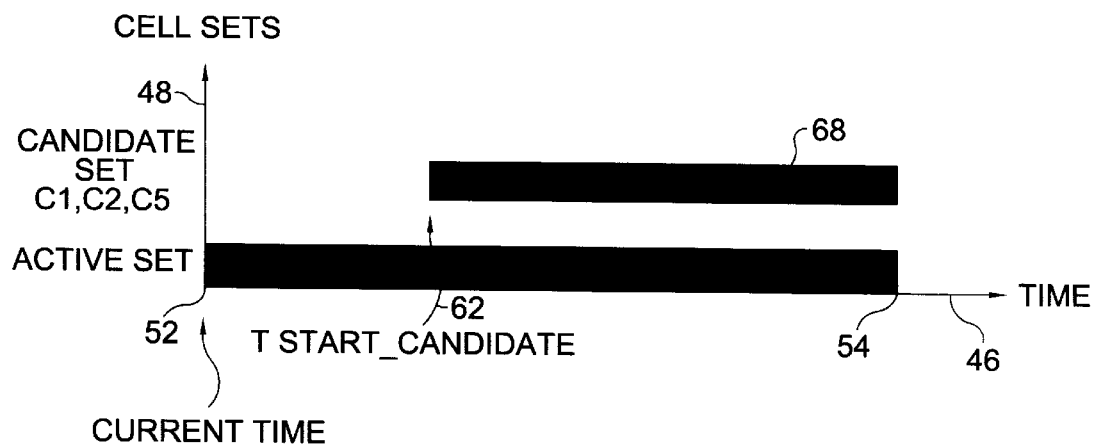
FIG. 5 illustrates a graphical representation, similar to those shown in FIGS. 3–4, but here representative of the resources reserved in the cellular communication system shown in FIG. 1 pursuant to a third SQC purchased pursuant to a service subscription.

FIG. 5 represents a third SQC, here designated class 3. The abscissa and ordinate axes 46 and 48 are scaled as noted previously. The bar 50 again indicates that resources are reserved at the cells of the active set starting at the $T_{start\_active}$ time 52 and extending to the $T_{end\_active}$ time 54 of termination of the communication session. Here, the bar 68 indicates that resources are reserved at selected cells, again cells C1, C2, and C5 of the candidate set. Here, the resources are reserved starting at the time 62, but extending until the $T_{end\_active}$ time 54.

Figure 6:
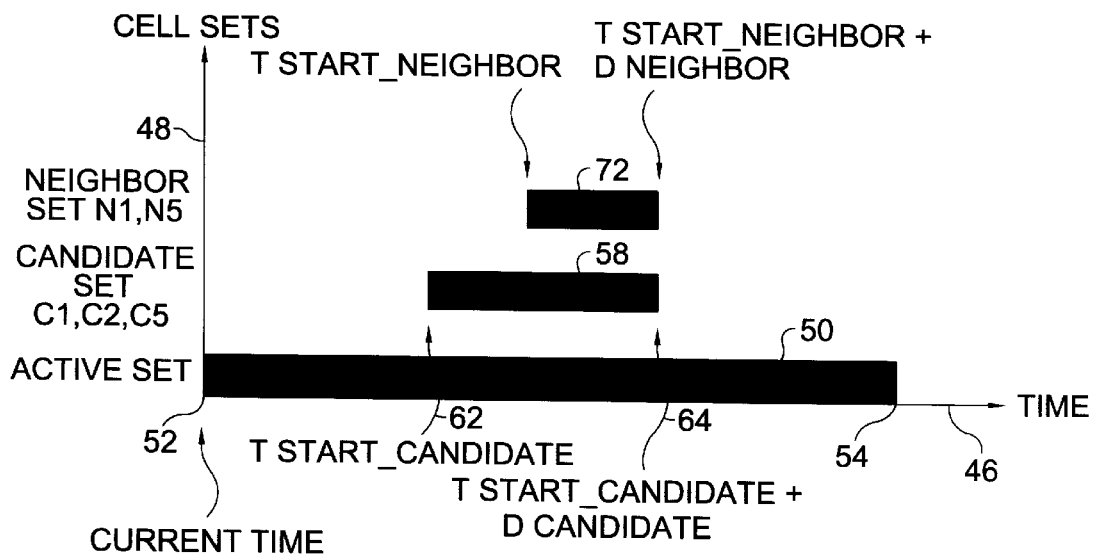
FIG. 6 illustrates a graphical representation, similar to those shown in FIGS. 3–5, but here representative of the resources reserved in the cellular communication system shown in FIG. 1 pursuant to a fourth SQC.

FIG. 6 illustrates a fourth SQC, here designated Class 4. The abscissa and ordinate axes 46–48 are again illustrated, and the bars 50 and 58 are again illustrated to indicate resources reserved in the cells of the active set and selected cells of the candidate set, respectively. The bar 50 indicates again that the resources are reserved as the cells of the active set starting at the $T_{start\_active}$ time 52 and extending until the $T_{end\_active}$ time 54. And, the bar 58 again indicates the resources are reserved at the selected cells of the candidate set starting at time 62 and extending until time 64. When the QoS level corresponds to the Class 4 SQC, resources are also reserved at selected cells of the neighbor set, here cells N1 and N5. The bar 72 represents the reservation of the resources at the selected cells of the neighbor set. Here, the resources are reserved at the time 74 for a duration extending until the time 64. The time 74 is of a second time delay relative to the $T_{start\_active}$ time 52 and here is of a time delay greater than the time delay extending to the start time 62. The delay period and the reservation period in the neighbor set is also dynamically determined.

Figure 7:
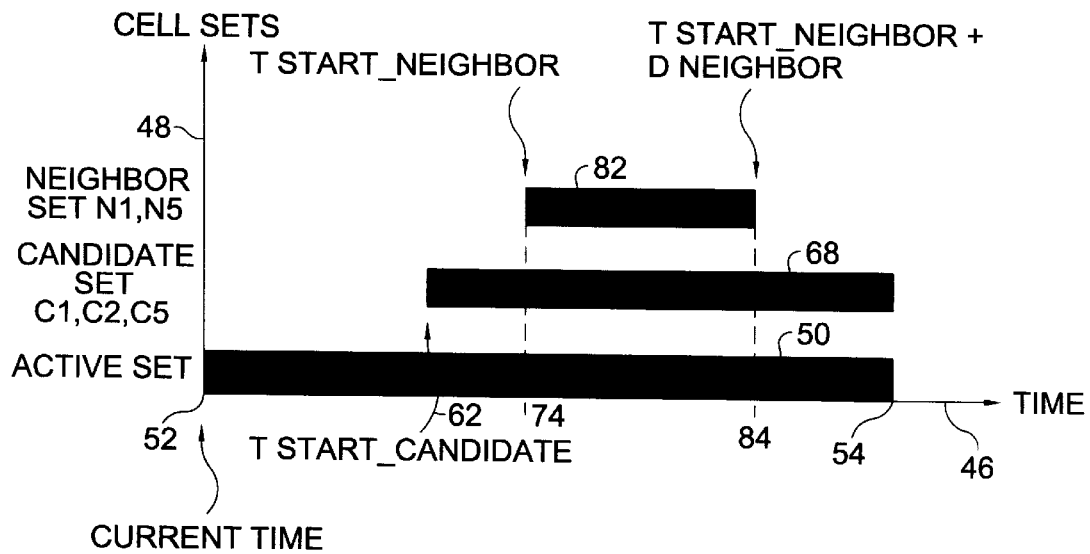
FIG. 7 illustrates a graphical representation, similar to those shown in FIGS. 3–6, but here representative of the resources reserved in the cellular communication system shown in FIG. 1 pursuant to a fifth SQC.

FIG. 7 illustrates a fifth SQC, here designated Class 5. Again, the abscissa and ordinate axes 46 and 48 are shown, and the bars 50 and 68 represent resources reserved at the cells of the active set and selected ones of the candidate set respectively. The $T_{start\_active}$ time 52, the $T_{end\_active}$ time 54, and the start time 62 again indicates the times at which the resources are reserved at the selected cells of the candidate set. The resources are reserved at the cells of the candidate set until $T_{end\_active}$ at time 54. Here, resources are reserved at selected cells, again cells N1 and N5, of the neighbor set for a period indicated by the bar 82. The start time at which the resources are reserved at the cells of the neighbor set is again time 74. Here, the duration of the period during which the resources are reserved extends until time 84.

Figure 8:
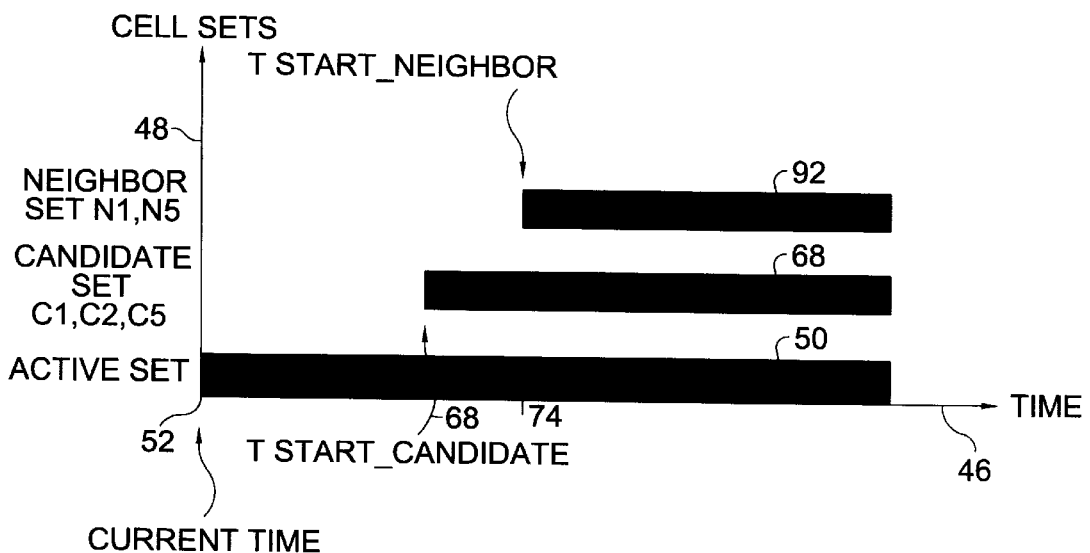
FIG. 8 illustrates a graphical representation, similar to those shown in FIGS. 3–7, but here representative of the resources reserved in the cellular communication system shown in FIG. 1 pursuant to a sixth SQC.

FIG. 8 illustrates a sixth SQC, designated Class 6. Here again, the abscissa and ordinate axes 46–48 are shown, and the bars 50 and 68 illustrate the resources reserved at the active set and selected ones of the candidate set, respectively. The resources are reserved at the cells of the active set starting at the $T_{start\_active}$ time 52 and extending until $T_{end\_active}$ time 54. And, the bar 68 indicates that the resources are reserved at the cells of the candidate set starting at time 62 and extending until the $T_{end\_active}$ time 54. Here, the resources are reserved at the selected cells of the neighbor set for time period indicated by the bar 92. Again, movement prediction techniques are utilized to reduce the number of cells of the neighbor set at which resources need be reserved to assure a selected level of mobility-independence.

Here, the start time at which the resources are reserved at the cells of the neighbor set is indicated at the time 74, and the duration during which the resources are reserved at the cells of the neighbor set extends until $T_{end\_active}$ time 54. The time delay of the time 74 relative to the $T_{start\_active}$ time 52 is again, in one embodiment, a fixed time duration, and in another embodiment, such time delay is dynamically determined responsive to characteristics of the mobile station, again, e.g., the velocity of the mobile station.

The Classes 1–6 of QoS levels represented in the FIGS. 3–8 illustrate that any of a plurality of levels of mobility-independence can be selected pursuant to a service subscription. Responsive to the selected SQC, an appropriate level of mobility-independence is provided to the user of a mobile station to assure better that the QoS levels required by the subscriber are maintained.

While the exemplary implementation illustrates six classes of QoS levels, analysis of the graphical representations of FIGS. 3–8 indicates that there are two variables in the QoS class definition. Namely, the starting time of the reservation of the resources and the duration that the resources are reserved, T and D, respectively, are determinative of the resource reservations. Each starting time and each duration during which the resources are reserved at selected cells of any of these sets of cells can either be specified, i.e., fixed, or can be dynamically determined. If dynamic determinations of the starting times and durations are utilized, movement prediction techniques including e.g., the mobile station's history and its velocity, network deployment, and resource availability can be used to make such determinations.

FIG. 9 illustrates a method, shown generally at 102, of the method of an embodiment of the present invention. The method 102 maintains a selected QoS level of communications between a mobile station and a fixed network. The fixed network includes a plurality of spaced-apart, fixed-site transceivers positioned throughout a geographic area. First, and as indicated by the block 104, an indication of a selected QoS level of which communications with the mobile station are to be maintained are stored. Then, and as indicated by the block 106, resources are selectively reserved at selected ones of the fixed-site transceivers for communications by the mobile station. The amount of resources caused to be reserved, and time periods during which the resources are reserved, is responsive to the QoS level associated with the mobile station. Thereby, an appropriate QoS level of communications by the mobile station is assured.

Thereby, through operation of an embodiment of the present invention, a selected QoS level of communications by a mobile station as the mobile station travels throughout a geographic area encompassed by a radio communication system is assured. Selected QoS levels are purchased pursuant to a service subscription or the QoS level is selected by a user at the start of a communication session. The amount of resources reserved by the system for use to communicate with the mobile station is dependent upon the QoS class of the service subscription.

The previous descriptions are of preferred examples for implementing the invention, and the scope of the invention should not necessarily be limited by this description. The scope of the present invention is defined by the following claims.

We claim:

1. In a multi-user, radio communication system having a fixed network including a plurality of spaced-apart, fixed-site transceivers positioned throughout a geographic area, each fixed-site transceiver defining a coverage area in which communications with a mobile station are permitted pursuant to a service subscription, a combination with the fixed network of apparatus for maintaining a selected QoS (quality of service) of the communications of the mobile station as the mobile station travels throughout the geographic area encompassed by the radio communication system, said apparatus comprising:

a service subscription register associated with the mobile station, said service subscription register for storing an indication of a selected QoS level of which communications with the mobile station are to be maintained, the indication of the selected QoS level indexed together with an identifier which identifies the mobile station;

a resource reserver coupled to receive information representative of the indication of the selected QoS level stored at said service subscription register and to the plurality of spaced-apart, fixed-site transceivers, said resource reserver for selectively reserving resources at a selected at least one of the fixed-site transceivers for communications by the mobile station, said selected at least one of the fixed-site transceivers defining at least one coverage area other than the coverage area in which the mobile station is currently operating, the resources caused to be selectively reserved, and time periods during which the resources are caused to be selectively reserved, responsive to the QoS level associated with the mobile station, the resources reserved by said resource reserver for assuring that the selected QoS level of the communications by the mobile station is available to the mobile station.

2. The apparatus of claim 1 wherein the plurality of spaced-apart, fixed-site transceivers include a first set of transceivers, each transceiver of the first set of transceivers having a traffic channel assigned for communications with the mobile station, wherein the selected QoS level, of which the indication thereof is stored at said service subscription register, comprises a first QoS level, and wherein said resource reserver reserves resources at each transceiver of the first set of transceivers for communications with the mobile station.

3. The apparatus of claim 2 wherein said resource reserver reserves resources at each transceiver of the first set until a communication session by the mobile terminal is terminated.

4. The apparatus of claim 2 wherein the radio communication system comprises a cellular CDMA (code division multiple access) communication system and wherein the first set of fixed-site transceivers comprises an active set of transceivers defined therein and associated with the mobile station.

5. The apparatus of claim 2 wherein the plurality of spaced-apart, fixed-site transceivers includes a second set of transceivers wherein the selected QoS level, of which the indication thereof is stored at said service subscription register, selectively comprises a second QoS level, and wherein said resource reserver reserves resources of at least a selected transceiver of the second set of transceivers for communications with the mobile station.

6. The apparatus of claim 5 wherein said resource reserver reserves the resources at the selected transceiver of the second set of transceivers at a first selected time delay relative to reservation of the resources at each transceiver of the first set of transceivers.

7. The apparatus of claim 6 wherein the first selected time delay is dynamically selected responsive to a characteristic of the mobile station.

8. The apparatus of claim 6 wherein said resource reserver reserves the resources at the selected transceiver of the second set of transceivers for a first selected duration subsequent to the first selected time delay.

9. The apparatus of claim 5 wherein the radio communication system comprises a cellular CDMA (code division multiple access) communication system and wherein the second set of fixed-site transceivers comprises a candidate set of transceivers defined therein and associated with the mobile station.

10. The apparatus of claim 5 wherein the selected QoS level, of which the indication thereof is stored at said service subscription register, selectively comprises a third QoS level, and wherein said resource reserver reserves resources of at least a selected transceiver of the second set of transceivers for communications with the mobile station, the resources reserved at the selected transceiver of the second set of transceivers starting at a selected start time until a communication session by the mobile terminal is terminated.

11. The apparatus of claim 10 wherein the selected start time at which said resource reserver reserves the resources at the selected transceiver of the second set of transceivers occurs subsequent to a first selected time delay relative to reservation of the resources at each transceiver of the first set of transceivers.

12. The apparatus of claim 5 wherein the plurality of spaced-apart, fixed-site transceivers includes a third set of transceivers, wherein the selected QoS level, of which the indication thereof is stored at said service subscription register, selectively comprises a fourth QoS level, and wherein said resource reserver further reserves resources of at least a selected transceiver of the third set of transceivers for communication with the mobile station.

13. The apparatus of claim 12 wherein said resource reserver reserves the resources at the selected transceiver of the second set of transceivers at a first selected time delay relative to reservation of the resources at each transceiver of the first set of transceivers and reserves the resources at the selected transceiver of the third set of transceivers at a second selected time delay relative to the reservation of the resources at each transceiver of the first set of transceivers.

14. The apparatus of claim 13 wherein the second selected time delay is greater than the first selected time delay.

15. The apparatus of claim 14 wherein said resource reserver reserves the resources at the selected transceiver of the second set of transceivers for a first selected duration subsequent to the first selected time delay and reserves the resources at the selected transceiver of the third set of transceivers for a second selected duration subsequent to the second selected time delay.

16. The apparatus of claim 15 wherein the first selected duration is of a time period greater than the second selected duration.

17. The apparatus of claim 16 wherein said resource reserver reserves resources at the selected transceiver of the second set until the communication session by the mobile terminal is terminated.

18. The apparatus of claim 17 wherein said resources reserver reserves resources at the selected transceiver of the third set until the communication session by the mobile terminal is terminated.

19. The apparatus of claim 13 wherein the radio communication system comprises a cellular CDMA (code division multiple access) communication system and wherein the third set of transceivers comprises a neighbor set of transceivers defined therein and associated with the mobile station.

20. The apparatus of claim 1 wherein the radio communication system comprises a cellular communication system having an HLR (home location register) associated with the mobile station and wherein said service subscription register is embodied at the HLR.

21. The apparatus of claim 1 wherein the radio communication system comprises a cellular communication system having at least one BSC (base station controller) coupled to the plurality of fixed-site transceivers and wherein said resource reserver is embodied at the BSC.

22. A method for maintaining a selected QoS (quality of service) level of communications between a mobile station and a fixed network having a plurality of spaced-apart, fixed-site transceivers positioned throughout a geographic area of a radio communication system as the mobile station travels throughout the geographic area encompassed by the radio communication system, said method comprising the steps of:

storing an indication of a selected QoS level of which communications with the mobile station are to be maintained; and selectively reserving resources at a selected at least one of the fixed-site transceivers for communications by the mobile station, said selected at least one of the fixed-site transceivers defining at least one coverage area other than the coverage area in which the mobile station is currently operating, the resources caused to be selectively reserved, and time periods during which the resources are caused to be selectively reserved, responsive to the QoS level associated with the mobile station, the resources reserved for assuring that the selected QoS level of the communications by the mobile stations is available to the mobile station.

\* \* \* \* \*